E. POTTS.
Corn Stalk Cutter.
No. 5,207.
Patented July 31, 1847.
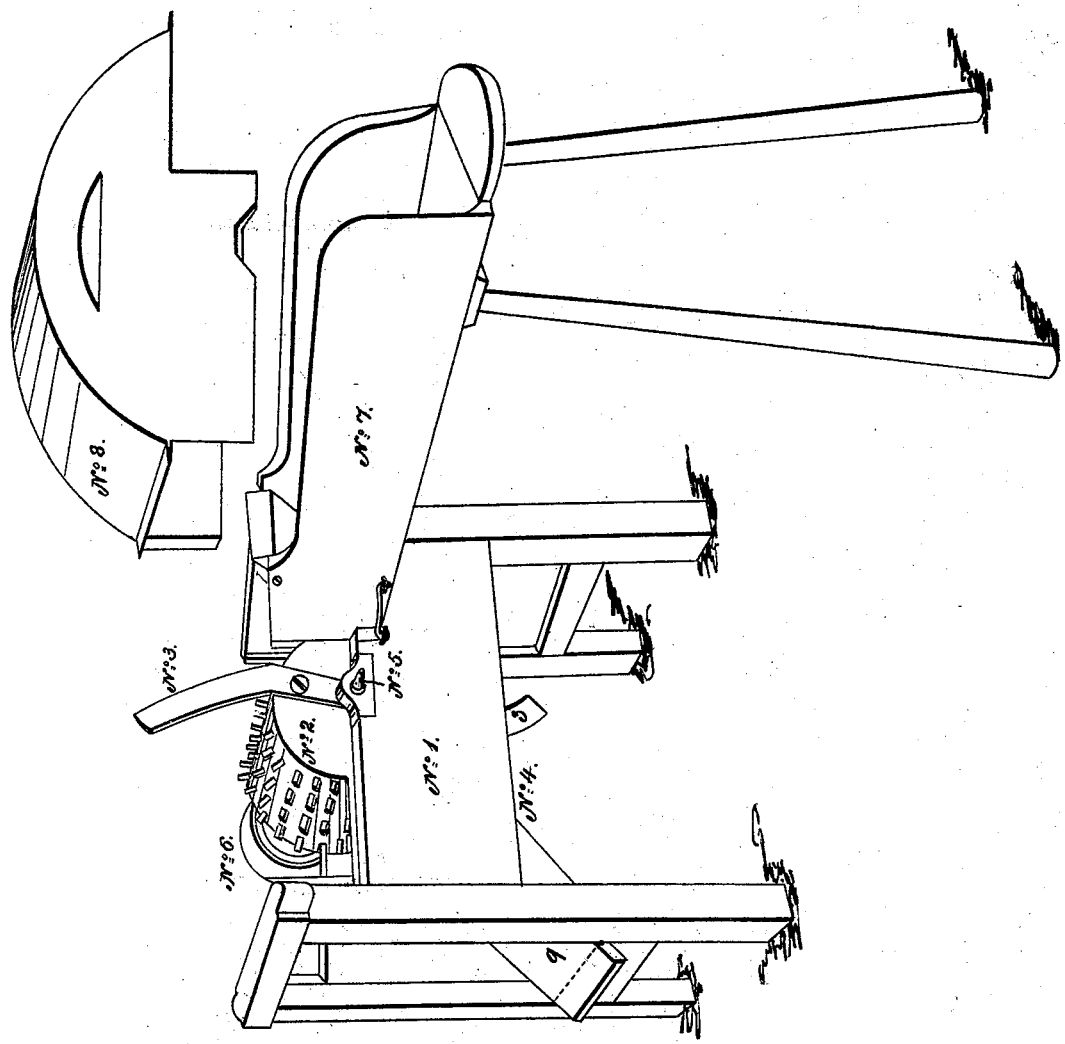

UNITED STATES PATENT OFFICE.

EZEKIEL POTTS, OF TREDYFFRIN, PENNSYLVANIA.

IMPROVEMENT IN MACHINES FOR CUTTING AND GRINDING CORNSTALKS.

Specification forming part of Letters Patent No. 5,207, dated July 31, 1847.

*To all whom it may concern:*

Be it known that I, EZEKIEL POTTS, of the township of Tredyffrin, in the county of Chester and State of Pennsylvania, have invented a new and useful Machine for the Purpose of Cutting and Crushing Corn-Fodder, &c., for Food for Cattle; and I do hereby declare that the following is a full, clear, and exact description of the construction and operation of the same, reference being had to the annexed drawings, making a part of this specification, which is a perspective view.

No. 1 is a frame supporting the machine, capable of being moved at pleasure and applied or attached to any power not exceeding four horses. The dimensions for a one-horse power are as follows, viz: in length two feet eight inches and in breadth one foot six inches.

No. 2 is the cylinder with an ordinary shaft (of iron) passing through the center and placed upon the frame No. 1 in cast-iron boxes, which boxes are fastened to the frame by means of screw-bolts and movable for the purpose of repairing, &c., if necessary, the said cylinder being one foot in length and ten inches in diameter, (made of wood or iron,) having inserted in it "stubs" one-half inch long running across the same in a zigzag form, placing each row one inch apart.

No. 3 is two knives resting upon the shaft at the end of the cylinder fastened to the end of the same by a screw-bolt near the circumference, by which means they are firmly fixed while cutting, and can be taken off by unscrewing the before-mentioned screw. The knives are about eight inches in length from the circumference of the cylinder, they cut obliquely, and are set at an angle of about forty-five degrees from the outer edge of the cylinder.

No. 4 is a concave made of wood placed in the frame immediately under the cylinder, with stubs inserted in it of the same length in such a way as to leave those of the cylinder pass immediately between those of the concave, thereby crushing the stalks after having been cut by the knives. This also is removable, if required.

No. 5 is the shaft passing immediately through the center of the cylinder, and which is placed upon the frame, as before described in No. 2.

No. 6 is a band-wheel placed upon the end of the shaft of the cylinder opposite the knives, and by means of a band passing over the same the machine may be connected to any power not exceeding four horses.

No. 7 is a feed-box resting upon the frame at the end next the knives, and is attached by hooks and staples, and the width of the box is made in proportion to the length of the knives. The fodder is passed through this box, is cut by the knives and falls in the concave, and is drawn through and crushed between the cylinder and concave, and discharged at No. 9 for delivery.

No. 8 is the lid fitting over the knives and cylinder for the purpose of throwing the fodder immediately into the crusher.

What I claim as my invention, and desire to secure by Letters Patent, is—

The combination of the knives with the crushing-cylinder and cutting-box, in the manner hereinbefore described.

The advantages of such a machine consist, chiefly, in its being capable of cutting and crushing a greater quantity of fodder, straw, &c., in the same time than any machine heretofore invented within my knowledge, the facility of its being attached to any power, such as common horse-power, of thrashing-machines, &c., also the perfection with which the knives cut placed in the manner described and the superior quality of the food after having been crushed, as before stated, between the cylinder and concave.

Another great advantage and one which is highly important to the agriculturist, and which is generally, I believe, made a point with the Commissioner of Patents, is the simplicity of its construction and the durability of the machine. The great advantages of the knives being placed as they are on the cylinder are, first, they are less liable to get dull than if they were placed in any other position; second, because they have less resistance to overcome from the fact of their having the same angle to cut through the fodder, &c., that they are placed at on the cylinder, for the greater the angle the greater the tendency the fodder has to slip from the knives, and consequently dull them.

EZEKIEL POTTS.

Witnesses:
ELIAS KNAUER,
ISAAC M. UMSTEAD.